United States Patent
Oda et al.

(10) Patent No.: US 11,379,321 B2
(45) Date of Patent: Jul. 5, 2022

(54) COMPUTER SYSTEM, CONTROL METHOD, AND RECORDING MEDIUM

(71) Applicant: Hitachi, Ltd., Tokyo (JP)

(72) Inventors: Takeshi Oda, Tokyo (JP); Takahiro Yamamoto, Tokyo (JP)

(73) Assignee: HITACHI, LTD., Tokyo (JP)

(*) Notice: Subject to any disclaimer, the term of this patent is extended or adjusted under 35 U.S.C. 154(b) by 68 days.

(21) Appl. No.: 17/019,430

(22) Filed: Sep. 14, 2020

(65) Prior Publication Data

US 2021/0326219 A1 Oct. 21, 2021

(30) Foreign Application Priority Data

Apr. 15, 2020 (JP) .............................. JP2020-072933

(51) Int. Cl.
*G06F 11/10* (2006.01)
*G06F 11/14* (2006.01)
*G06F 9/52* (2006.01)
*G06F 12/0842* (2016.01)

(52) U.S. Cl.
CPC ............ *G06F 11/1469* (2013.01); *G06F 9/52* (2013.01); *G06F 11/1076* (2013.01); *G06F 12/0842* (2013.01); *G06F 2201/82* (2013.01); *G06F 2212/1032* (2013.01)

(58) Field of Classification Search
CPC ............. G06F 11/1076; G06F 11/1092; G06F 11/1096; G06F 11/1088; G06F 11/1084; G06F 11/108; G06F 2201/82; G06F 2212/1032

See application file for complete search history.

(56) References Cited

U.S. PATENT DOCUMENTS

| | | | | |
|---|---|---|---|---|
| 6,233,696 B1* | 5/2001 | Kedem | ............... | G06F 11/0727 711/114 |
| 8,132,044 B1* | 3/2012 | Saeed | ................. | G06F 11/1088 714/6.1 |
| 8,726,129 B1* | 5/2014 | Aguilera | ............. | G06F 11/1088 714/770 |
| 2011/0208994 A1* | 8/2011 | Chambliss | .......... | G06F 11/1092 714/6.24 |
| 2013/0326264 A1* | 12/2013 | Resch | ................. | G06F 11/1092 714/6.2 |
| 2018/0373429 A1 | 12/2018 | Yamamoto et al. | | |
| 2020/0285551 A1* | 9/2020 | Fujii | ................... | G06F 11/1076 |

FOREIGN PATENT DOCUMENTS

WO 2017/145223 A1 8/2017

* cited by examiner

*Primary Examiner* — Yolanda L Wilson
(74) *Attorney, Agent, or Firm* — Mattingly & Malur, PC (57) ABSTRACT

In recovery processing, a distributed storage system 100 locks a storage area in which user data for recovery that is user data serving as data for recovery is stored in drives 405, and releases the lock after caching the user data for recovery in a memory 401 of any of computer nodes 101. Then, the distributed storage system 100 recovers recovery target data on basis of the user data for recovery cached in the memory 401. In write processing, the distributed storage system 100 updates the user data for recovery cached in the memory 401 in accordance with a write request and then writes the user data in accordance with the write request.

8 Claims, 11 Drawing Sheets

COMPUTER SYSTEM, CONTROL METHOD, AND RECORDING MEDIUM

CROSS-REFERENCE TO RELATED APPLICATION

The present application claims priority from Japanese application JP 2020-072933, filed on Apr. 15, 2020, the contents of which is hereby incorporated by reference into this application.

BACKGROUND

This disclosure relates to a computer system, a control method, and a recording medium.

International Publication No. WO 2017/145223 discloses a distributed storage system that stores user data in a plurality of computer nodes in a distributed manner. In the distributed storage system, a redundant code for recovering the user data is generated on the basis of the user data, and stripe data including the user data and the redundant code based on the user data is stored in the plurality of computer nodes in a distributed manner.

In recovery processing for recovering the user data, the computer node that stores the redundant code therein reads other user data included in the same stripe data as the user data that is a recovery target from another computer node as user data for recovery, and recovers the user data that is a recovery target on the basis of the user data for recovery and the redundant code.

SUMMARY

In the feature described in International Publication No. WO 2017/145223, when the user data for recovery is rewritten in the computer node that stores therein the user data for recovery after the user data for recovery is read, the redundant code is also rewritten in accordance with the rewriting. Therefore, the consistency between the read user data for recovery and the redundant code is lost, and improper user data is recovered. Therefore, in the recovery processing, a lock that prohibits write processing on the user data stored in the other computer nodes needs to be acquired.

However, when a lock is acquired for the user data, the write processing on the user data cannot be performed until the recovery processing is completed, and hence there is a problem in that the response speed with respect to a write request decreases.

An object of this disclosure has been made in view of the abovementioned problem, and is to provide a computer system, a control method, and a recording medium capable of alleviating the decrease of the response speed with respect to a write request when data is recovered.

A computer system according to one aspect of this disclosure is a computer system including a plurality of computer nodes each including a storage device and a memory. In the computer system, the storage device of each of the computer nodes is configured to store therein stripe data including user data and a redundant code based on the user data as data elements in a distributed manner, recovery processing for recovering recovery target data that is any of the data elements on basis of data for recovery that is other data element includes locking a storage area in which user data for recovery that is the user data serving as the data for recovery is stored in the storage device, releasing the lock after the user data for recovery is cached in the memory of any of the computer nodes, and recovering the recovery target data on basis of the user data for recovery cached in the memory, and write processing in accordance with a write request for the storage area includes updating the user data for recovery cached in the memory in accordance with the write request and writing the user data on the storage area in accordance with the write request.

According to the present invention, the decrease of the response speed with respect to the write request when the data is recovered can be alleviated.

DETAILED DESCRIPTION OF THE EMBODIMENT

An embodiment of this disclosure is described below with reference to the drawings.

In the description below, processing may be described such that a "program" is the agent thereof, but the program performs designated processing with use of a storage resource (for example, a memory) and/or a communication interface device (for example, a port), as appropriate, by being executed by a processor (for example, a CPU (Central Processing Unit)), and hence the subject of the processing may be a processor. The processing described such that the subject thereof is a program may be processing performed by a processor or a computer including the processor.

Figure 1:
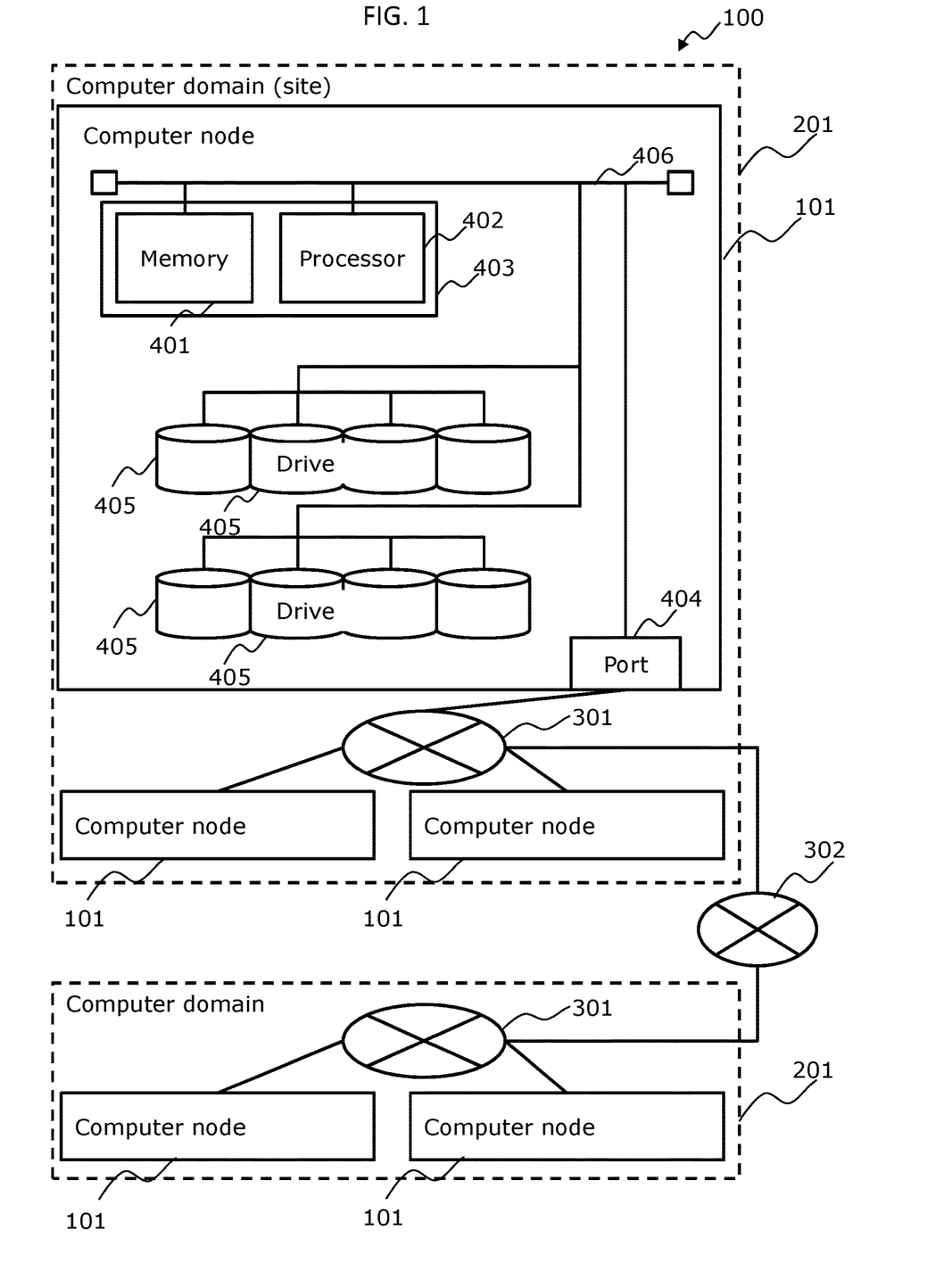
FIG. 1 is a diagram illustrating one example of the system configuration of a distributed storage system of one embodiment of this disclosure.

FIG. 1 is a diagram illustrating one example the system configuration of a distributed storage system of one embodiment of this disclosure. A distributed storage system 100 illustrated in FIG. 1 is a computer system including a plurality of computer nodes 101. The plurality of computer nodes 101 configure a plurality of computer domains 201. The computer nodes 101 included in the same computer domain 201 are coupled to each other over a back-end network 301. The computer domains 201 are coupled to each other over an external network 302.

The computer domain 201 may be provided so as to correspond to a geographical region or may be provided so as to correspond to a virtual or physical topology of the back-end network 301, for example. In this embodiment, each domain corresponds to any of sites that are a plurality of regions geographically separated from each other.

The computer node 101 is configured by a general computer for a server, for example. In the example in FIG. 1, the computer node 101 includes a processor package 403 including a memory 401 and a processor 402, a port 404, and a plurality of drives 405. The memory 401, the processor 402, the port 404, and the drives 405 are coupled to each other over an internal network 406.

The memory 401 is a recording medium readable by the processor 402 and records a program that defines the operation of the processor 402 thereon. The memory 401 may be a volatile memory such as a DRAM (Dynamic Random Access Memory) or a nonvolatile memory such an SCM (Storage Class Memory).

The processor 402 is a CPU (Central Processing Unit), for example, and realizes various functions by reading a program recorded on the memory 401 and executing the read program.

The port 404 is a back-end port that is coupled to the other computer nodes 101 over the back-end network 301 and transmits and receives information to and from the other computer nodes 101.

The drive 405 is a storage device that stores various data therein and is also referred to as a disk drive. The drive 405 is a hard disk drive, an SSD (Solid State Drive), and the like having an interface such as an FC (Fibre Channel), an SAS (Serial Attached SCSI), and an SATA (Serial Advanced Technology Attachment).

Figure 2:
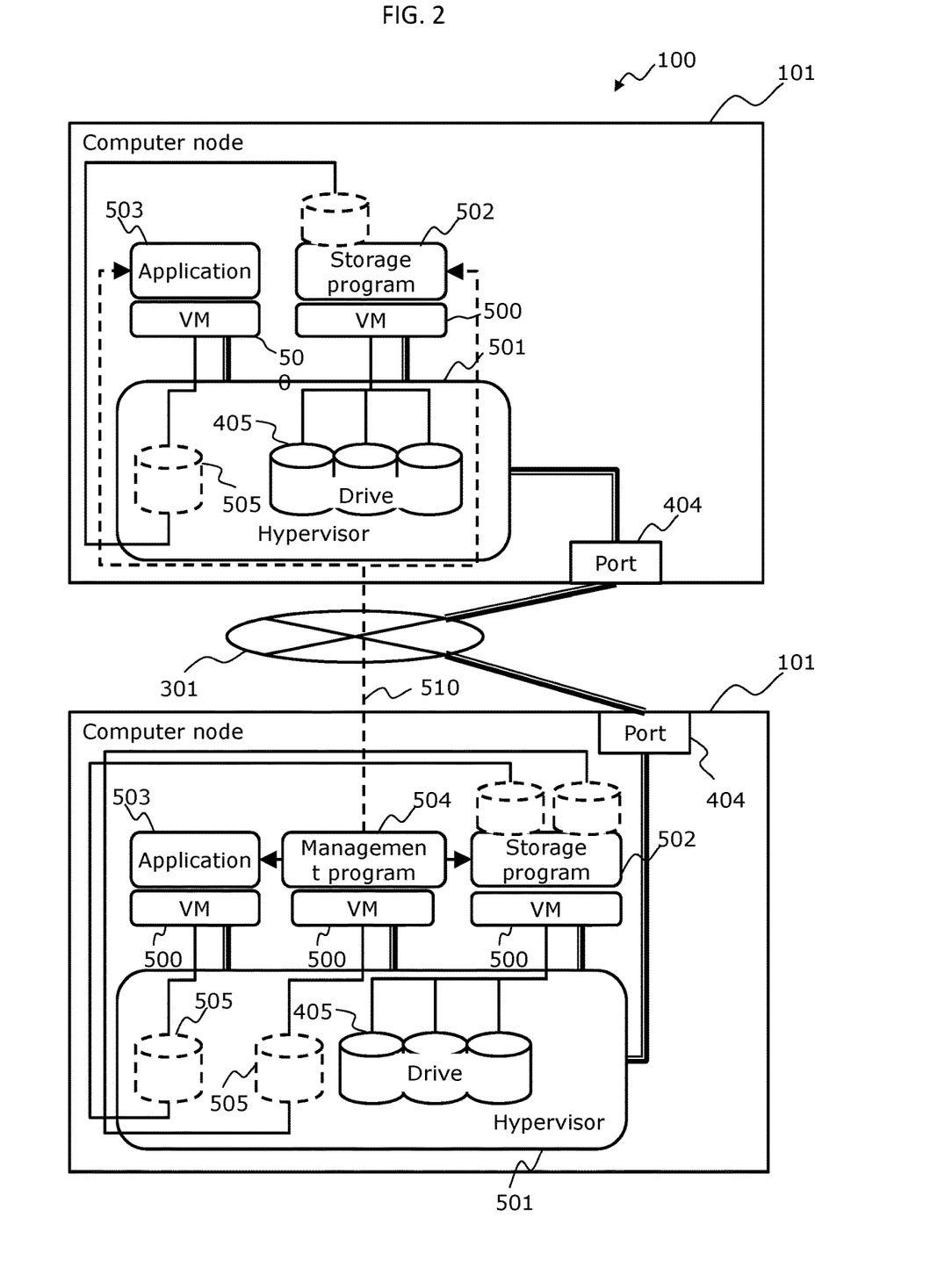
FIG. 2 is a diagram illustrating one example of the software configuration of the distributed storage system of one embodiment of this disclosure.

FIG. 2 is a diagram illustrating one example of the software configuration of the distributed storage system of one embodiment of this disclosure.

The computer node 101 executes a hypervisor 501 that is software for realizing a virtual machine (VM) 500. In this embodiment, the hypervisor 501 realizes a plurality of virtual machines 500.

The hypervisor 501 manages the allocation of hardware resources to the realized virtual machines 500, and actually transfers an access request for the hardware resources from the virtual machine 500 to the hardware resources. The hardware resources are the memory 401, the processor 402, the port 404, the drives 405, and the back-end network 301 illustrated in FIG. 1, for example.

The virtual machine 500 executes an OS (Operating System) (not shown) and executes various program on the OS. In this embodiment, the virtual machine 500 executes any of a storage program 502, an application program (abbreviated to application in the drawings) 503, and a management program 504. The management program 504 does not necessarily need to be executed in all of the computer nodes 101, and only needs to be executed in at least one of the computer nodes 101. The storage program 502 and the application program 503 are executed in all of the computer nodes 101.

The virtual machine 500 manages the allocation of virtual resources provided from the hypervisor 501 to the executed programs and transfers access requests from the programs to the virtual resources to the hypervisor 501.

The storage program 502 is a program for managing storage I/O with respect to the drives 405. The storage program 502 virtualizes the plurality of drives 405 in a bunch and provides the virtualized drives 405 to the other virtual machines 500 via the hypervisor 501 as a virtual volume 505.

When the storage program 502 receives a request for storage I/O from the other virtual machines 500, the storage program 502 performs the storage I/O with respect to the drives 405 and returns the result thereof. The storage program 502 communicates with the storage program 502 executed by another computer node 101 over the back-end network 301 and realizes the functions of the storage such as data protection and data migration.

The application program 503 is a program for a user that uses the distributed storage system. The application program 503 transmits a request for storage I/O to the virtual volume provided by the storage program 502 via the hypervisor 501 when the storage I/O is performed.

The management program 504 is a program for managing the configurations of the virtual machine 500, the hypervisor 501, and the computer node 101. A management program 504 transmits a request for network I/O with respect to another computer node 101 via the virtual machine 500 and the hypervisor 501. The management program 504 transmits a request for management operation to the other virtual machines 500 via the virtual machine 500 and the hypervisor 501. The management operation is operation relating to the configurations of the virtual machine 500, the hypervisor 501, and the computer node 101, and is addition, deletion, restoration, and the like of the computer nodes 101.

The storage program 502, the application program 503, and the management program 504 do not necessarily need to be executed on the virtual machine 500 and may be executed on the OS directly operating on hardware.

In the distributed storage system 100 described above, the user data is distributed to and stored in the plurality of computer nodes 101 (specifically, the drives 405 thereof). Parity data that is a redundant code for recovering user data is generated on the basis of the user data. The user data and parity data based on the user data are collectively referred to as a stripe (stripe data). The data (the user data and the parity data) included in the same stripe is stored in different computer nodes 101.

When a failure occurs in the drives 405 and the like and the data stored in the computer node 101 cannot be read, the distributed storage system 100 recovers the data that cannot be read on the basis of other data included in the same stripe as the data that cannot be read.

The recovery processing for recovering the data is described in more detail below. The recovery processing includes correction read processing for reading data that is a recovery target while recovering the data when the data is read, and rebuilding processing for recovering the data that is a recovery target and writing the data on any of the computer nodes 101 at a predetermined timing. The recovery processing is performed by the storage program 502.

Figure 3:
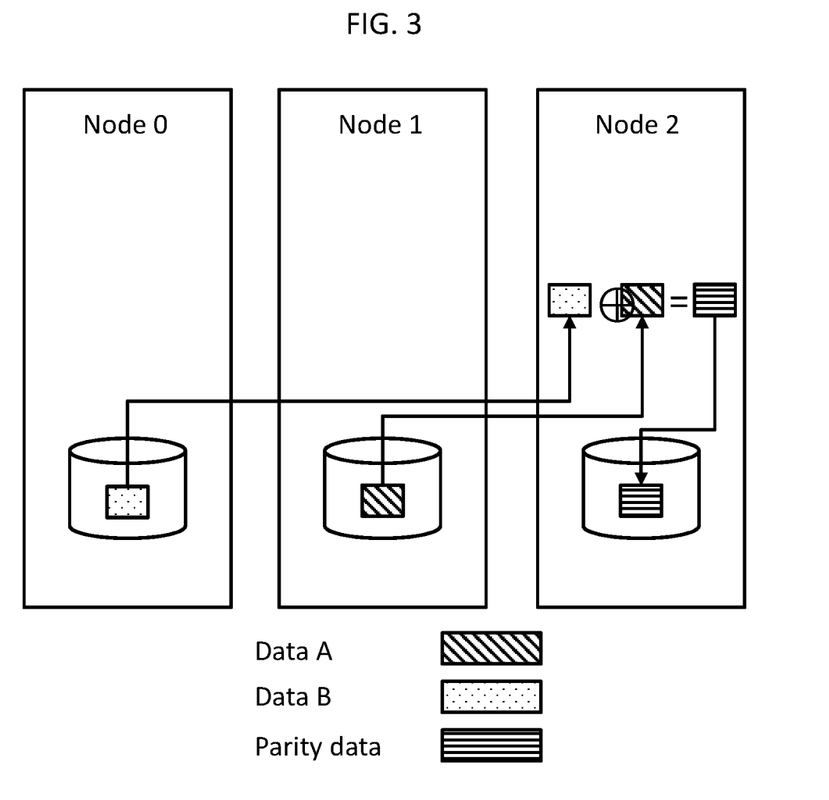
FIG. 3 is a diagram for describing one example of rebuilding processing.
Figure 4:
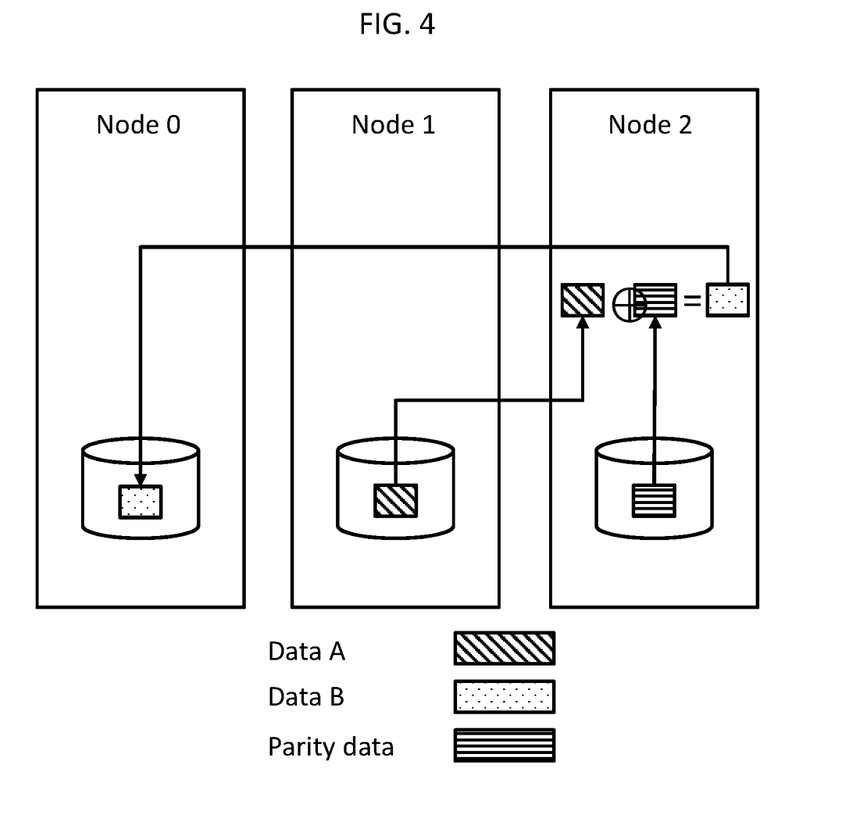
FIG. 4 is a diagram for describing another example of the rebuilding processing.

FIG. 3 and FIG. 4 are diagrams for describing one example of the rebuilding processing. In the examples in FIG. 3 and FIG. 4, as the distributed storage system 100, a distributed storage system having a 2D+1P configuration in which one parity data is generated with respect to two user data is illustrated. In the distributed storage system, three nodes 0 to 2 are included as the computer nodes 101, the node 0 stores therein data B that is user data, the node 1 stores therein data A that is user data, and the node 2 stores parity data therein. In this embodiment, the rebuilding processing is performed in the node 2 that stores the parity data therein. The node that stores user data therein may be hereinafter referred to as a data node, and the node that stores parity data therein may be hereinafter referred to as a parity node.

FIG. 3 is a diagram for describing parity rebuilding processing that is rebuilding processing for recovering the parity data. In the parity rebuilding processing, the data A and B that is the user data is data for recovery for recovering the parity data.

In the parity rebuilding processing, the parity node 2 reads the data B from the data node 0 and reads the data A from the data node 1. Then, the parity node 2 recovers the parity data and writes the parity data on the drives 405 of own node 2 on the basis of the read data A and B.

FIG. 4 is a diagram for describing data rebuilding processing that is rebuilding processing for recovering the user data. In FIG. 4, an example in which the data B is recovered is illustrated. In this case, the data A and the parity data is data for recovery for recovering the data B.

In the data rebuilding processing, the parity node 2 reads the data A from the data node 1 and reads the parity data from own node 2. Then, the parity node 2 recovers the data B and writes the data B on the data node 0 on the basis of the read data A and the parity data. The correction read processing is different from the data rebuilding processing in that the data B recovered by the parity node 2 is output to the transmission source of a correction read request for the data B instead of being written on the node 0.

Figure 5:
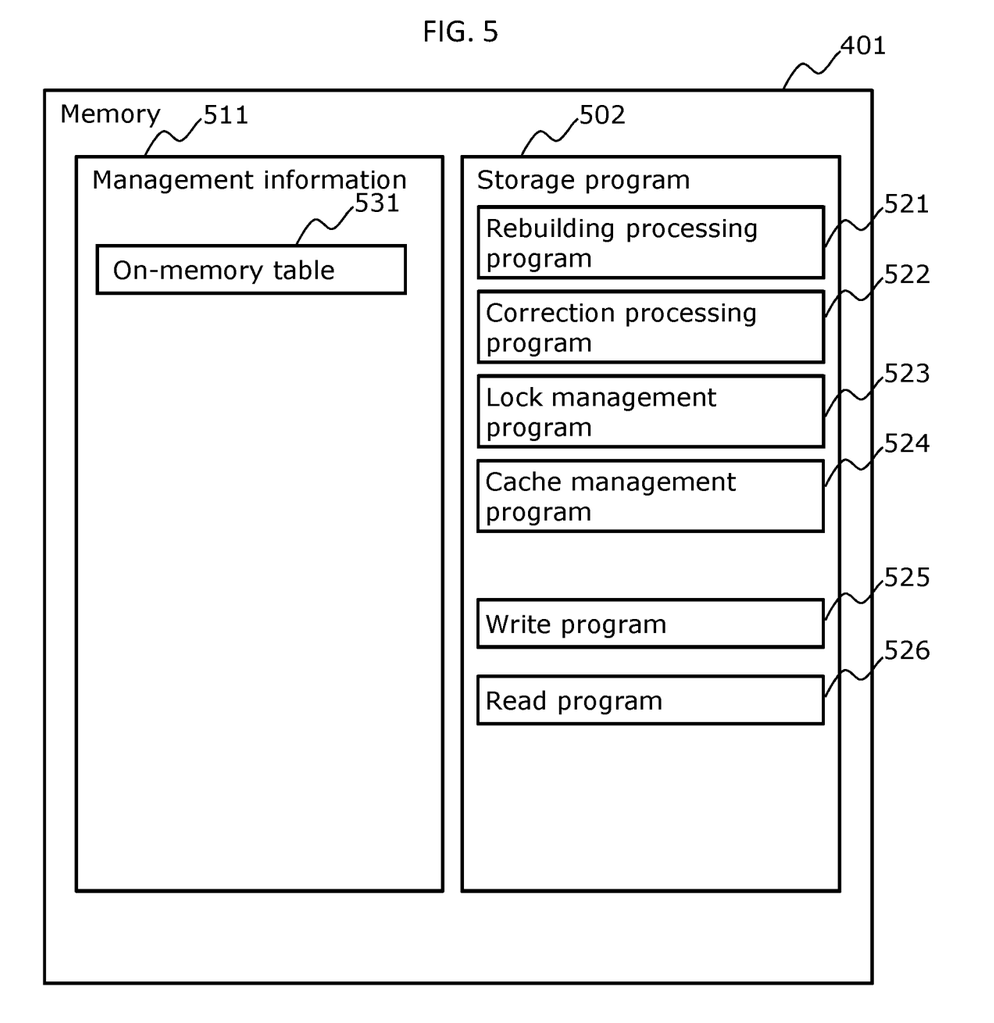
FIG. 5 is a diagram illustrating one example of the configuration of a storage program and management information.

FIG. 5 is a diagram illustrating the inner configuration of the storage program 502 that performs the recovery processing and the inner configuration of management information used in the recovery processing by the storage program 502.

As illustrated in FIG. 5, the storage program 502 and management information 511 are recorded on the memory 401, for example. The storage program 502 includes a rebuilding processing program 521, a correction processing program 522, a lock management program 523, a cache management program 524, a write program 525, and a read program 526. The management information 511 includes an on-memory table 531.

The rebuilding processing program 521 is a program for performing the rebuilding processing. The correction processing program 522 is a program for performing the correction read processing. The lock management program 523 is a program for managing a lock (specifically, an exclusive lock) for an area in which data is stored. The cache management program 524 is a program for managing the caching of the data to the memory 401. The write program 525 is a program for performing write processing with respect to the data. The read program 526 is a program for performing read processing with respect to the data.

Figure 9:
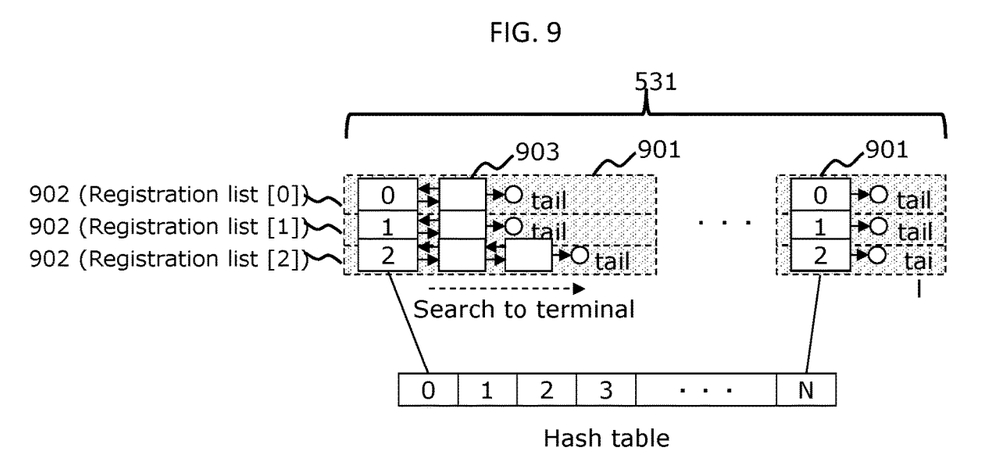
FIG. 9 is a diagram illustrating one example of an on-memory table.

The on-memory table 531 is cache management information for managing data to be cached in the memory 401 by the cache management program 524 (see FIG. 9).

Figure 6:
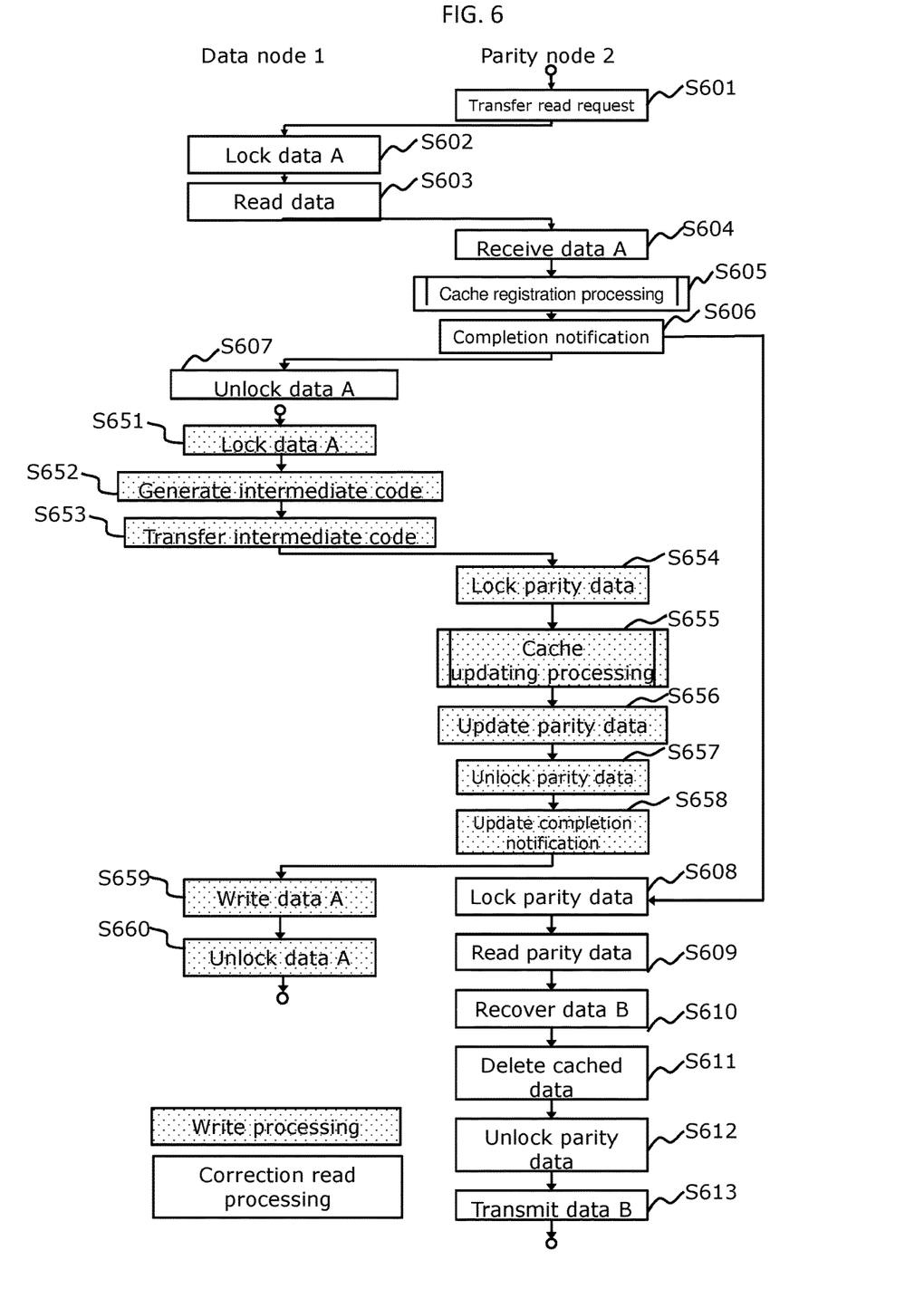
FIG. 6 is a flowchart for describing one example of correction read processing.

FIG. 6 is a flowchart for describing one example of the correction read processing performed by the distributed storage system 100. An example in which the distributed storage system 100 has a 2D+1P configuration illustrated in FIG. 4 and FIG. 5 and the data B is recovered is described below.

In the correction read processing, the correction processing program 522 of the parity node 2 first receives a correction read request for requesting the correction reading of the data B and transfers a read request for the data A included in the same stripe as the data B that is the target of the correction reading to the data node 1 on the basis of the correction read request (Step S601).

When the read program 526 of the data node 1 receives the read request, the lock management program 523 performs lock processing on the storage area in which the data A in accordance with the read request is stored in the drives 405 (Step S602). In this embodiment, the lock processing is performed by designating an LBA (Logical Block Address) as the address of the storage area that is the target of the lock.

The read program 526 reads the data A from the drives 405 as the read data and transfers the data A to the parity node 2 (Step S603).

The correction processing program 522 of the parity node 2 receives the read data (Step S604). The cache management program 524 executes cache registration processing for caching the received read data in the memory 401 (see FIG. 10) (Step S605). Then, the correction processing program 522 transmits a completion notification indicating that the reading of the data is completed to the data node 1 (Step S606).

When the read program 526 of the data node 1 receives the completion notification, the lock management program 523 performs unlock processing for releasing the lock on the storage area in which the data A is stored (Step S607).

In the parity node 2, when the correction processing program 522 transmits the completion notification in Step S606, the lock management program 523 performs lock processing on the storage area in which the parity data in accordance with the correction read request is stored in the drives 405 (Step S608). The parity data in accordance with the correction read request is specifically parity data included in the same stripe as the data B that is the target of the reading.

The correction processing program 522 reads the parity data from the drives 405 (Step S609). The correction processing program 522 reads the read data cached in the memory 401 in Step S605 from the memory 401 and recovers the data B on the basis of the read data that is read and the parity data (Step S610). Then, the cache management program 524 deletes the cached read data from the memory 401 (Step S611). The lock management program 523 performs unlock processing on the storage area in which the parity data is stored (Step S612). Then, the correction processing program 522 transmits the recovered data B to the transmission source of the correction read request (Step S613) and ends the processing.

When the lock on the storage area of the data A is released in Step S607, write processing may be performed on the storage area. In the drawing, an example in which the write processing is performed before the lock processing of the parity data in Step S608 is illustrated.

In the write processing, the write program 525 of the data node 1 first receives a write request with respect to the storage area in which the data A is stored. The lock management program 523 performs lock processing on the storage area (the storage area in which the data A is stored) in accordance with the write request (Step S651). The write program 525 generates a difference between the data A stored in the drives 405 and data A' in accordance with the write request as an intermediate code on the basis of the write request (Step S652). The write program 525 transmits the intermediate code to the parity node 2 (Step S653).

When the cache management program 524 of the parity node 2 receives the intermediate code, the lock management program 523 performs lock processing on the storage area in which the parity data in accordance with the intermediate code is stored (Step S654). The parity data in accordance with the intermediate code is parity data included in the same stripe as the data A used in the generation of the intermediate code.

The cache management program 524 executes cache updating processing (see FIG. 11) for updating the read data cached in the memory 401 from the data A to the data A' on the basis of the intermediate code (Step S655). The write program 525 updates the parity data stored in the drives 405 on the basis of the updated data A' (Step S656).

Then, the lock management program 523 performs unlock processing on the storage area in which the parity data is stored (Step S657). The cache management program 524 transmits an update completion notification indicating that the update of the data A is completed to the data node 1 (Step S658). When the write program 525 of the data node 1 receives the update completion notification, the write program 525 writes the data A' in accordance with the write request (Step S659). Then, the lock management program 523 performs unlock processing on a storage area in which the data A' is stored (Step S661) and ends the processing.

By the processing above, even when the data A is rewritten to the data A' and the parity data is rewritten in accordance therewith before the recovery of the data B is completed in Step S610, the data A cached in the memory 401 is also updated to the data A', and hence the loss of the consistency between the user data and the redundant code in the stripe can be suppressed. Therefore, the lock on the data A is released in Step S607 before the recovery of the data B ends, and hence the decrease of the response speed with respect to the write request for the data A can be alleviated.

Figure 7:
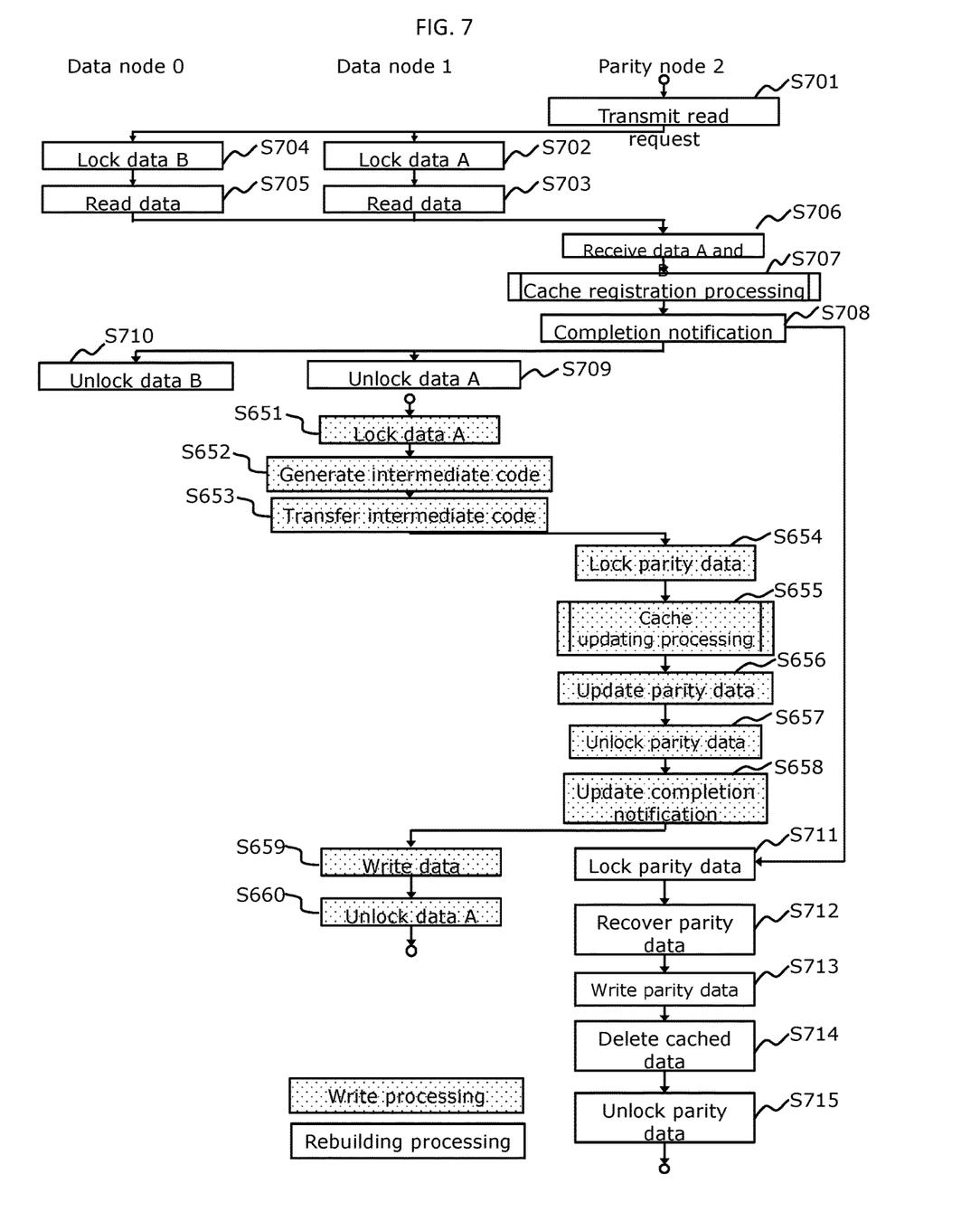
FIG. 7 is a flowchart for describing one example of the rebuilding processing.

FIG. 7 is a flowchart for describing one example of the parity rebuilding processing. In FIG. 7, a case in which the distributed storage system illustrated in FIG. 4 and FIG. 5 has a 2D+1P configuration is described as an example.

In the parity rebuilding processing, the rebuilding processing program 521 of the parity node 2 first transmits a read request for the data A included in the same stripe as the parity data that is the recovery target to the data node 1 and transmits a read request for the data B included in the same stripe as the parity data that is the recovery target to the data node 0 (Step S701).

In the data node 1, when the read program 526 receives the read request, the lock management program 523 performs lock processing on the storage area in which the data A in accordance with the read request is stored in the drives 405 (Step S702). The read program 526 reads the data A from the drives 405 as read data and transfers the data A to the parity node 2 (Step S703).

In the data node 0, when the read program 526 receives the read request, the lock management program 523 performs lock processing on the storage area in which the data B in accordance with the read request is stored in the drives 405 (Step S704). The read program 526 reads the data B from the drives 405 as read data and transfers the data B to the parity node 2 (Step S705).

The rebuilding processing program 521 of the parity node 2 receives the read data (the data A and B) from the data nodes 0 and 1 (Step S706). The cache management program 524 executes cache registration processing (see FIG. 10) for caching the read data in the memory 401 (Step S707). Then, the rebuilding processing program 521 transmits a completion notification indicating that the reading of the data is completed to the data nodes 0 and 1 (Step S708).

In the data node 1, when the read program 526 receives the completion notification, the lock management program 523 performs unlock processing on the storage area in which the data A is stored (Step S709). In the data node 0, when the read program 526 receives the read completion notification, the lock management program 523 performs unlock processing on the storage area in which the data B is stored (Step S710).

In the parity node 2, when the rebuilding processing program 521 transmits the completion notification in Step S708, the lock management program 523 performs lock processing on the storage area in which the parity data that is the recovery target is stored in the drives 405 (Step S711). The rebuilding processing program 521 reads the read data cached in the memory 401 in Step S607 from the memory 401, recovers the parity data (Step S712) on the basis of the read data that is read, and writes the recovered parity data on the drives 405 (Step S713).

The cache management program 524 deletes the cached read data from the memory 401 (Step S714). The lock management program 523 performs unlock processing on the parity data (Step S715) and ends the processing.

When the lock on the storage areas of the data A and B is released in Step S709 and S710, write processing may be performed on the storage areas also in the parity rebuilding processing described in FIG. 7. In the drawing, an example in which the write processing on the data A is performed before the lock processing of the parity data is performed in Step S711 is illustrated. The write processing is similar to the write processing described in FIG. 6. However, the cache updating processing in Step S655 may be skipped.

By the processing above, as with the correction read processing described in FIG. 6, the lock on the data A and B may be released before the recovery of the parity data ends, and hence the decrease of the response speed with respect to the write request for the data A and B can be alleviated.

Figure 8:
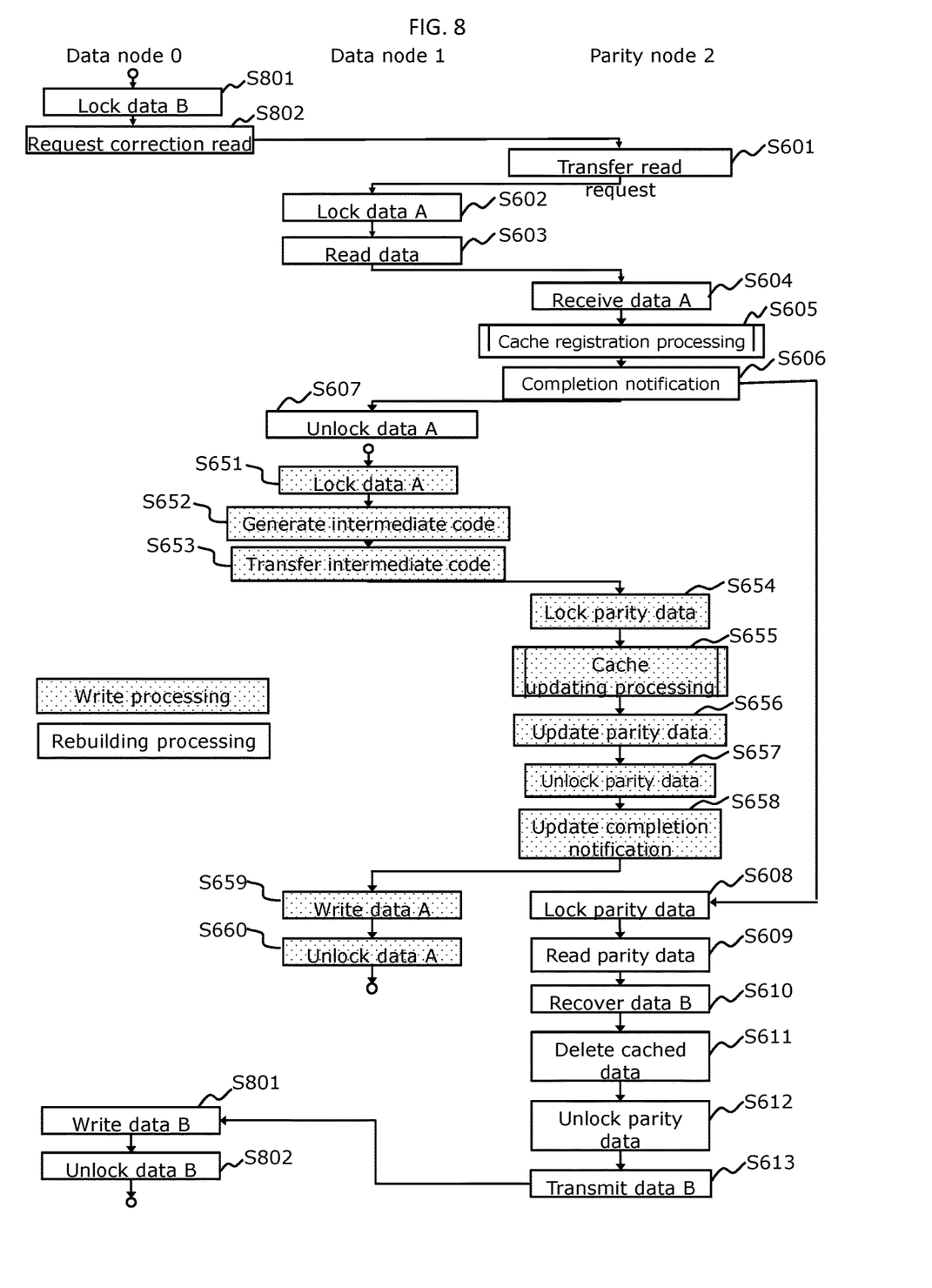
FIG. 8 is a flowchart for describing another example of the rebuilding processing.

FIG. 8 is a flowchart for describing the data rebuilding processing. In FIG. 7, a case where the distributed storage system illustrated in FIG. 4 and FIG. 5 has a 2D+1P configuration and the data B is recovered is described as an example.

In the data rebuilding processing, the lock management program 523 of the data node 0 in which the data B that is the recovery target is stored first performs lock processing on the storage area in which the data B that is the recovery target is stored (Step S801). Then, the rebuilding processing program 521 transmits a correction read request of the data B to the parity node 2 as a rebuilding request for requesting the recovery of the data B (Step S802). Then, the processing in Step S601 to Step S613 in FIG. 6 is executed.

When the processing in Step S613 ends, the rebuilding processing program 521 of the data node 0 that is the transmission source of the correction read request receives the data B from the parity node 2. The write program 525 stores the received data B in the drives 405 (Step S803). Then, the lock management program 523 performs unlock processing on the storage area in which the data B is stored in the drives 405 (Step S804) and ends the processing.

When the lock on the storage area of the data A is released in Step S607, write processing may be performed on the storage area also in the data rebuilding processing described in FIG. 8. In the drawing, an example in which the write processing is performed before the lock processing of the parity data is performed in Step S608. The write processing is similar to the write processing described in FIG. 6.

By the processing above, as with the correction read processing described in FIG. 6, the lock on the data A is released before the recovery of the data B ends, and hence the decrease of the response speed with respect to the write request for the data A can be alleviated.

FIG. 9 is a diagram for specifically describing the on-memory table 531 that manages the cached data in the memory 401.

The on-memory table 531 includes a registration table 901 indicating a cache area on the memory 401 in which data is cached for each of a plurality of types (N types here) of hash values generated on the basis of the cached data. The registration table 901 includes registration lists 902 indicating the cache areas of the data read from the plurality of computer nodes 101 as records. In FIG. 9, an example in which the distributed storage system 100 has the 2D+1P configuration illustrated in FIG. 3 and FIG. 4 is illustrated. In this case, the registration table 901 includes a registration list [0] to a registration list [2] corresponding to the nodes 0 to 2 as the registration lists 902.

The head fields of the registration list [0] to the registration list [2] store therein identification numbers for identifying the registration list [0] to the registration list [2]. The second fields and fields thereafter of the registration list [0] to the registration list [2] store therein registration entries 903 indicating the cache areas of the data read from the computer nodes corresponding to the registration lists. Terminal information (tail) indicating that the storage of the registration entries has ended is stored behind all of the registration entries 903.

Each of the registration entries 903 includes a head address of the cache area in which the read data that is data that is read is cached, a head LBA of the read data, and the length of the read data.

When the read data is cached in the memory 401, the cache management program 524 adds the registration entry 903 in accordance with the read data to the on-memory table 531. When the read data is read from the memory 401, the cache management program 524 determines the cache area of the read data by searching the registration entry 903 in accordance with the read data from the head to the terminal of the registration list in accordance with the read data.

Figure 10:
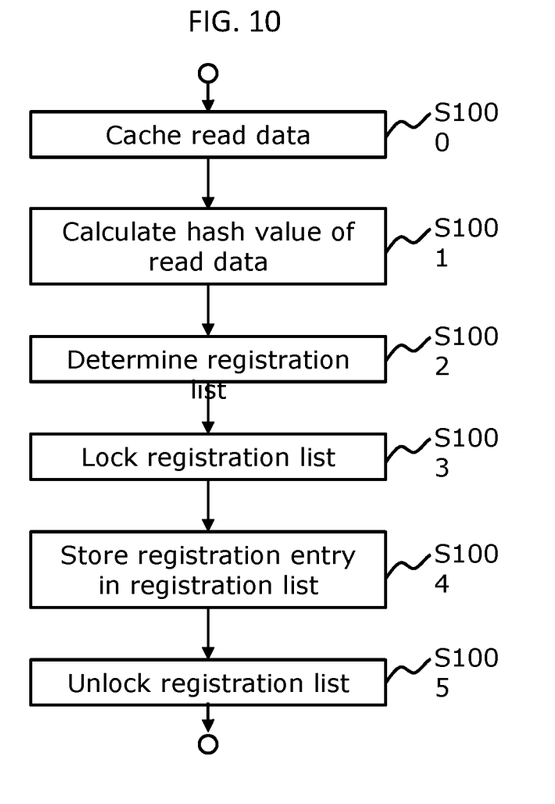
FIG. 10 is a flowchart for describing one example of cache registration processing.

FIG. 10 is a flowchart for describing one example of the cache registration processing in Step S605 or Step S707 in FIG. 6 to FIG. 8. The data read by the parity node is hereinafter referred to as read data.

In the cache registration processing, the cache management program 524 caches the read data in the memory 401 (Step S1000). Then, the cache management program 524 calculates a hash value on the basis of the read data (Step S1001). Specifically, the cache management program 524 calculates the hash value on the basis of the storage area in which the read data is stored in the drives 405. For example, the LBA of the storage area of the drives 405 is divided into a plurality of address blocks in advance, and the cache management program 524 calculates the hash value by inputting the head LBA of the address block including the storage area in which the read data is stored to a hash function as a key. When the storage area of the read data spreads across a plurality of address blocks, the cache management program 524 calculates the hash value for each of the plurality of address blocks, for example.

The cache management program 524 determines the registration list 902 corresponding to the computer node of which read data is read included in the registration table 901 corresponding to the calculated hash value from the on-memory table 531 (Step S1002). The cache management program 524 acquires the lock of the determined registration list 902 (Step S1003).

The cache management program 524 stores the registration entry 903 in accordance with the read data in the second field or fields thereafter of the determined registration list (Step S1004). Then, the cache management program 524 releases the lock on the registration list 902 (Step S1005).

When there are a plurality of read data as in the example in FIG. 7, the cache management program 524 performs the cache registration processing for each read data.

Figure 11:
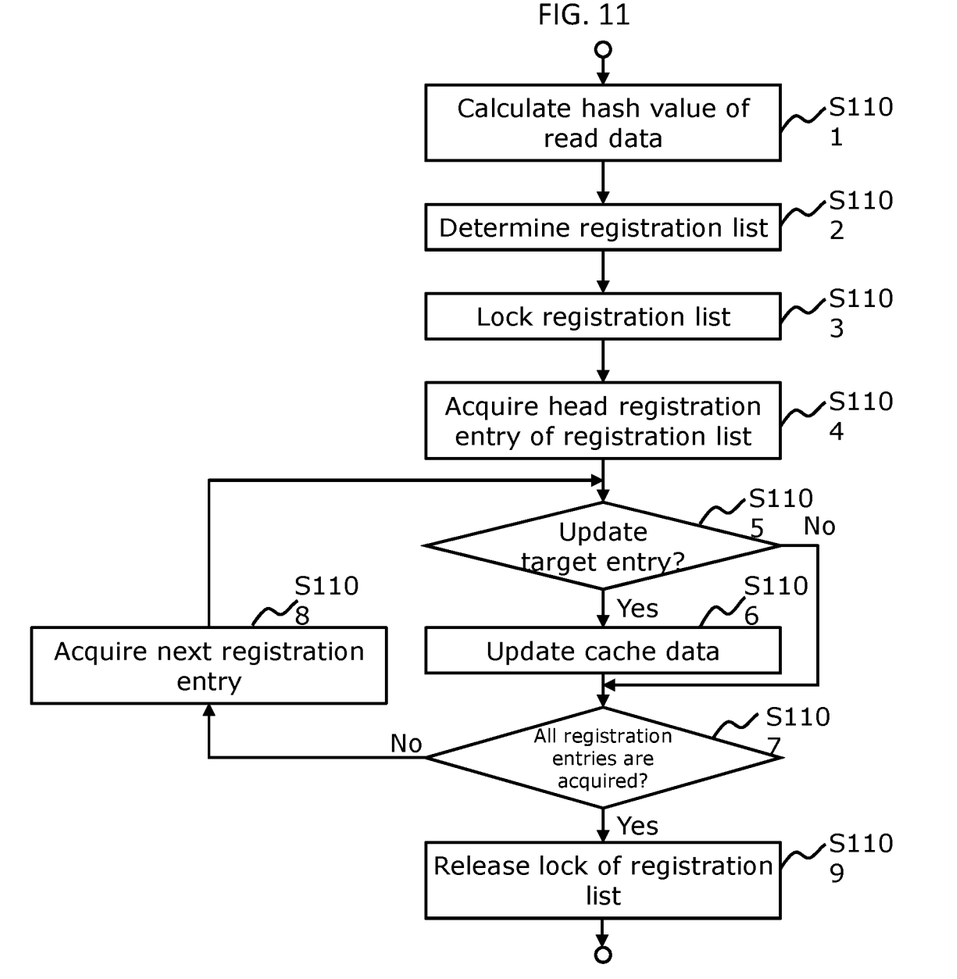
FIG. 11 is a flowchart for describing one example of cache updating processing.

FIG. 11 is a flowchart for describing one example of the cache updating processing in Step S655 from FIG. 6 to FIG. 8.

In the cache updating processing, the cache management program 524 first calculates the hash value on the basis of the read data (Step S1101). The method for calculating the hash value is the same as the calculation method in the processing in Step S1001 in FIG. 10.

The cache management program 524 determines the registration list 902 corresponding to the computer node of which read data is read included in the registration table 901 corresponding to the calculated hash value from the on-memory table 531 (Step S1102). The cache management program 524 acquires the lock of the determined registration list 902 (Step S1103).

The cache management program 524 acquires any of the registration entries 903 in the determined registration list (Step S1104). The cache management program 524 acquires the head registration entry 903 here.

The cache management program 524 determines whether the acquired registration entry 903 is an update target entry indicating the cache area of the data that is the update target (Step S1105). Specifically, the cache management program 524 first calculates the range of the registered read data from the head LBA and the length of the cache data included in the registration entry 903, and determines whether the range and the range of the data (the data used in the generation of the intermediate code) that is the update target match each other. When those ranges match each other, the cache management program 524 determines that the registration entry 903 is the update target entry.

When the registration entry 903 is the update target entry, the cache management program 524 updates the data cached in the cache area in accordance with the length of the read data and the head address of the cache area indicated in the registration entry 903 on the basis of the intermediate code (Step S1106). When the registration entry 903 is not the update target entry, the cache management program 524 skips the processing in Step S1106.

Then, the cache management program 524 determines whether all of the registration entries 903 in the registration list 902 determined in Step S1102 are acquired (Step S1107).

When not all of the registration entries 903 are acquired, the cache management program 524 acquires the next registration entry (Step S1108) and returns to the processing in Step S1106.

Meanwhile, when all of the registration entries 903 are acquired, the cache management program 524 releases the lock on the registration list 902 (Step S1109) and ends the processing.

When the cache data is deleted in Step S611, the corresponding registration entry 903 is deleted.

As described above, according to this embodiment, in the recovery processing, the distributed storage system 100 locks the storage area in which the user data for recovery that is the user data serving as the data for recovery is stored in the drives 405, and releases the lock after the user data for recovery is cached in the memory 401 of any of the computer nodes 101. Then, the distributed storage system 100 recovers the recovery target data on the basis of the user data for recovery cached in the memory 401. In the write processing, the distributed storage system 100 updates the user data for recovery cached in the memory 401 in accordance with the write request, and then writes the user data in accordance with the write request. Therefore, the decrease of the response speed with respect to the write request when the data is recovered can be alleviated.

In this embodiment, the recovery processing includes the correction read processing, the parity rebuilding processing, and the data rebuilding processing. Therefore, the decrease of the response speed with respect to the write request in each recovery processing can be alleviated.

In this embodiment, the cached data is managed with use of the hash value, and hence time necessary for searching the cached data can be reduced.

In this embodiment, the data cached in the memory 401 is updated on the basis of the intermediate code that is the difference between the data stored in the drives 405 and the data in accordance with the write request, and hence communication traffic can be alleviated.

The embodiment of this disclosure described above is an example for describing this disclosure and does not intend to limit the scope of this disclosure to the embodiment. A person skilled in the art can carry out this disclosure in other various modes without departing from the scope of this disclosure.

What is claimed is:

1. A computer system, comprising a plurality of computer nodes each including a storage device and a memory, wherein:
   the storage device of each of the computer nodes is configured to store therein stripe data including user data and a redundant code based on the user data as data elements in a distributed manner;
   recovery processing for recovering recovery target data that is any of the data elements on basis of data for recovery that is other data element includes locking a storage area in which user data for recovery that is the user data serving as the data for recovery is stored in the storage device, releasing the lock after the user data for recovery is cached in the memory of any of the computer nodes, and recovering the recovery target data on basis of the user data for recovery cached in the memory; and
   write processing in accordance with a write request for the storage area includes updating the user data for recovery cached in the memory in accordance with the write request and writing the user data on the storage area in accordance with the write request.

2. The computer system according to claim 1, wherein:
   the recovery processing is correction read processing in accordance with a correction read request for reading the recovery target data while recovering the recovery target data; and
   the recovered recovery target data is transmitted to a transmission source of the correction read request.

3. The computer system according to claim 1, wherein the recovery processing is rebuilding processing for recovering the user data serving as the recovery target data and writing the user data on the storage device corresponding to the user data.

4. The computer system according to claim 1, wherein the recovery processing is rebuilding processing for recovering the redundant code serving as the recovery target data and writing the redundant code on the storage device corresponding to the redundant code.

5. The computer system according to claim 1, wherein:
   in the recovery processing, cache management information indicating an area in the memory in which the data for recovery is cached is generated for each hash value based on the data for recovery; and
   in the write processing, the data for recovery that is an update target is searched from the memory on basis of the hash value based on the data for recovery and the cache management information.

6. The computer system according to claim 5, wherein the cache management information indicates the area for each computer node in which the data for recovery is stored.

7. The computer system according to claim 1, wherein:
   one of the computer nodes that has received the write request is configured to transmit, as an intermediate code, a difference between the data for recovery stored in the storage device and the user data written in accordance with the write request to one of the computer nodes having a memory in which the data for recovery is cached; and
   the computer node having the memory in which the data for recovery is cached is configured to update the data for recovery cached in the memory on basis of the intermediate code.

8. A control method for a computer system, the computer system comprising a plurality of computer nodes each including a storage device and a memory, the storage device of each of the computer nodes storing therein stripe data including user data and a redundant code based on the user data as data elements in a distributed manner, wherein:
   storing, in the storage device of each of the computer nodes, stripe data including user data and a redundant code based on the user data as data elements in a distributed manner;
   locking, in recovery processing for recovering recovery target data that is any of the data elements on basis of data for recovery that is other data element, a storage area in which user data for recovery that is the user data serving as the data for recovery is stored in the storage device, releasing the lock after the user data for recovery is cached in the memory of any of the computer nodes, and recovering the recovery target data on basis of the user data for recovery cached in the memory; and
   updating, in write processing in accordance with a write request for the storage area, the user data for recovery cached in the memory in accordance with the write request and writing the user data on the storage area in accordance with the write request.

* * * * *